S. C. CARY.
BAND TIGHTENER.
APPLICATION FILED JAN. 19, 1918.
1,412,165.
Patented Apr. 11, 1922.
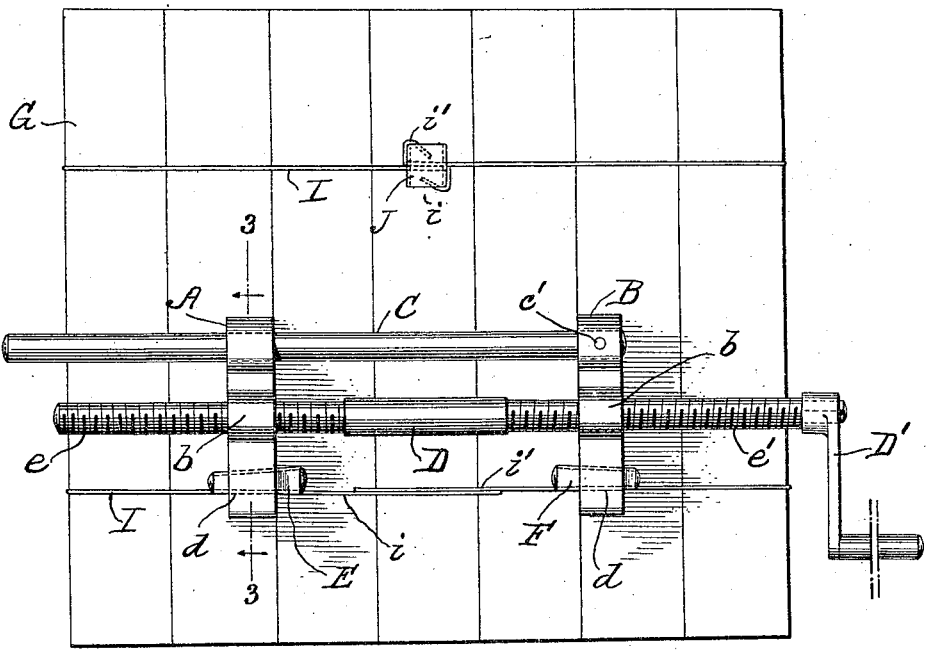
Fig. 1.
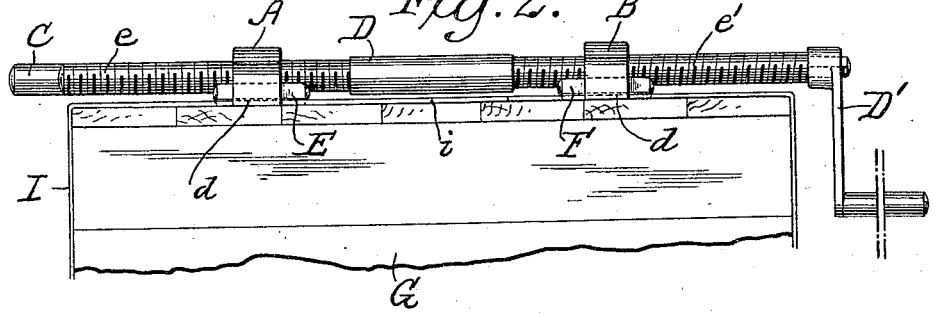
Fig. 2.
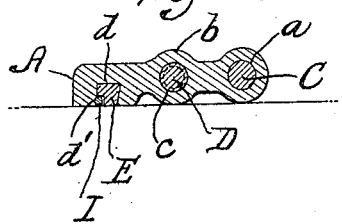
Fig. 3.
Fig. 4.
INVENTOR
Spencer C. Cary
BY
ATTORNEY

UNITED STATES PATENT OFFICE.

SPENCER C. CARY, OF BROOKLYN, NEW YORK, ASSIGNOR TO CARY MANUFACTURING COMPANY, OF BROOKLYN, NEW YORK, A CORPORATION OF NEW YORK.

BAND TIGHTENER.

1,412,165.   Specification of Letters Patent.   Patented Apr. 11, 1922.

Application filed January 19, 1918. Serial No. 212,553.

*To all whom it may concern:*

Be it known that I, SPENCER C. CARY, a citizen of the United States, residing at the city of New York, borough of Brooklyn, county of Kings, and State of New York, have invented a certain new and useful Band Tightener, of which the following is a specification.

This invention is a device whereby bands may be drawn tightly around packing cases, boxes, shooks, and shipping packages of different kinds.

According to this invention, it is sought to stretch a wire band so tightly around a shipping package as to result in a partial embedding of the band into the material of the package, whereby the stretched band operates to bind together the parts of the package and said band cannot become displaced upon said package.

To this end, a salient feature of the invention is a band tightener constructed to lie close to or flat upon the shipping package, thus obviating a certain slack which arises in the band when certain prior tightening devices are employed.

The invention consists, further, in the provision of band-gripping devices which are easily operated and which act with marked efficiency in gripping the band so as to preclude any tendency of the band of slipping relatively to the tightening device, particularly when the band is subjected to great strain in the operation of stretching said band around the shipping package, so as to apply the band to the package.

Other features and advantages of the invention will appear from the following description taken in connection with the drawings, wherein—

Figure 1 is a plan view illustrating the mode of using my device in stretching a band around a shipping package, said figure illustrating one of the bands applied to the package in a sealed condition.

Figure 2 is a side elevation of the device shown in Figure 1.

Figure 3 is a cross section through one of the members or heads on the line 3—3 of Figure 1.

Figure 4 is a detailed view on an enlarged scale of one of the gripping wedges.

A B are two members or heads, C a guide stem connecting said heads, and D a screw spindle for effecting the relative movement between the heads.

Each head is cast or otherwise formed of a single piece of metal, preferably of the generally oblong form shown in Figure 1. The heads are provided at one end with openings $a$ and intermediate the ends of each head it is enlarged at $b$ in order that a screw-threaded opening $c$ may be formed in the head, it being preferred to make the opening $c$ in the heads A B of opposite screw threads. In addition to the opening $a$ and the threaded opening $c$, each head is provided with a slot or recess $d$, said recess or slot extending transversely through the head and the walls of the recess converging as shown in dotted lines in Figure 1. According to this invention the recess or slot $d$ is cut away at one of its side walls so that the slot or recess opens through a side or face of the head A or B. One wall of each recess is provided with a groove $d'$ in which is adapted to be received an end portion of a band, as will be hereinafter described.

The spindle D is provided with two threaded portions $e$ $e'$, one thread being a right-hand screw and the other a left-hand screw, but it may be desirable under some circumstances to employ a screw having a single continuous thread. The threaded parts $e$ $e'$ of the screw spindle are screwed into the threaded openings $c$ of the heads A B, the end portions of the screw spindle protruding for suitable distances beyond the heads, and one of said end portions being provided with an operating member such as a crank D'.

Cooperating with the heads A B are the band-gripping wedges E F, one of which is shown in detail in Fig. 4. The wedge is a tapering piece of metal, the faces of which converge so as to correspond to the convergence of the walls of the slot or recess $d$ in the head. The tapering wedge is provided, furthermore, with a serrated or toothed gripping face $f$. It should be stated that the slot $d$ in the head A tapers in an opposite direction to the taper of the slot $d$ in the head B, and thus the two wedges E F are adapted to occupy reversed positions to each other when thrust into the recesses or slots $d$ of the respective heads.

The entire tightening device is adapted to be imposed or laid flat upon a shipping package, one of which is indicated at G in Fig. 1. The recesses *d* in the heads A B open through the under face of said heads so as to lie next to the shipping package G, and thus a band I can lie flat upon the shipping package when the end portions *i i'* of said band are received within the recesses *d* of heads A B.

The guide stem C is smooth externally, one end portion of said stem being fitted in the opening *a* of the member or head B and being made fast thereto by suitable means, such as the cross pin *c'*, see Fig. 1. Said stem fits loosely in the opening *a* of the other member or head A, and thus the stem is attached to one member and fitted slidably to the other member for the purpose of retaining the two members in their desired relation and of guiding said members as they are moved toward or away from each other by the operation of the screw spindle D. The tightening device herein disclosed is adapted for use more particularly in connection with wire bands adapted for binding or securing together the parts of a shipping package, two of said bands being indicated at I in Fig. 1. When it is desired to use the device for tightening a band, the wire is passed around the shipping package and the two end portions *i i'* are brought into lapping relation, see the lower illustration in Fig. 1. The heads or members A B are now laid sidewise upon the packing case so that one end portion, as *i*, of the band is received in the recess *d* of head A, whereas the other end portion *i'* of said band is received in the recess of the head B. The operator now inserts the wedges E and F into the recesses of the respective heads and by lightly tapping on the wedges they are driven home, whereby the wedges and the recessed heads cooperate in gripping the respective end portions of the band, said end portions being usually in lapping relation and free from the gripping engagement with the tightening device. The screw spindle is now rotated in a proper direction to simultaneously draw the heads A and B toward each other, and as the band is gripped by the wedges to the moving heads, it follows that said band is stretched tightly around the case; in fact, the screw provides power means for stretching the band so tightly that it will become embedded in the material of the shipping package, particularly at the corners thereof. When the tightening device shall have been operated sufficiently to place the desired tension on the band, the operator stops turning the screw spindle and proceeds to fasten and seal the loose or free end portions of the band. The wedges E F are displaced by driving them out of the recesses in the heads A B, thus releasing the band, whereupon the entire tightening device can easily be removed from the packing case, leaving the wire band firmly applied to said packing case, and with the ends thereof anchored in position by a sealing member.

An important advantage secured by my invention is that the band is stretched without lifting said band relatively to the package, such stretching operation taking place while the band remains in contact with said package, thus avoiding the presence of a limited amount of slack in the band after the same shall have been secured or attached. In prior devices of which I have knowledge, it is necessary to lift the end portions of the band away from the package, in order to grip said end portions in the stretching devices. This mode of operation leaves a permanent allowance of slack in the band after stretching it, because said lifting part of the band is out of contact with the package, and after securing the band and removing the stretching device, this slack is communicated to the stretching portion of the band, thus relaxing the tension thereon to an appreciable degree. As herein stated, my stretching device allows the band to remain in contact with the package during the operations of gripping the band and of stretching the same, after which the slack end portions of the band are attached to the sealing device J so as to leave no slack, so that when the stretcher is detached, there is no appreciable or perceptible relaxation in the tension of the band.

The stretching device is simple in construction, consisting of a few parts which are economically made and assembled. If desired, the wedges may be attached by flexible cords or chains to the heads A B, to prevent loss of said wedges, although this obvious arrangement is not necessary. The device is, moreover, easily applied, operated and removed, and it is light in weight so that it can be handled readily. It is apparent that one or more seals J may be used on the package in connection with each band; in fact, a number of seals may be fitted to the band and one seal driven into each panel of the shipping package, thus effectively sealing the same and contributing to the security of the package.

Having thus fully described the invention, what I claim as new and desire to secure by Letters Patent is:

1. A band tightener embodying a plurality of heads each provided with a slot the walls of which converge, said slot being cut away on one side of the head and one wall of said slot having a groove, combined with wedges each insertible into the slot of one head and positioned for cooperation with the groove so as to grip a band, and means for effecting a relative movement between said heads.

2. A band tightener embodying a plurality of heads each provided with a recess one wall of which is grooved, wedging means cooperating with said recesses, the faces of the wedging means opposite the grooves being serrated, and means for effecting a relative movement between said heads.

3. A band tightener embodying a plurality of heads each provided with a recess the walls of which converge, wedges each adapted to enter one of said recesses for gripping a band by contact with one wall of said recess and one wall of the wedge, a guide stem operating to retain said heads in operative positions, and a screw spindle co-operating with the heads for effecting a relative movement between them.

4. In a band tightener, a plurality of heads each having a face adapted for contact with a package and provided with a recess one side of which opens through said contact face and another wall of which constitutes a band-gripping face, and a binder-gripping member movable within said recess, one face of said binder-gripping member being in opposing relation to the binder-gripping face constituted by said wall of the recess, in combination with means for effecting a relative movement between said heads.

5. In a band tightener, a plurality of heads each having a substantially flat face adapted for contact with a package and provided with a recess one side of which is cut away so as to open through said contact face whereby a binder is adapted to lie within said recess without displacing said binder from contact with the surface of the package, and binder-gripping means co-operating with said recess for gripping a binder by and between a surface of said head and a face of said binder-gripping means, in combination with means for effecting a relative movement between said heads.

6. In a band tightener, a plurality of heads each having a substantially flat face adapted for contact with a package and provided with a recess one side of which is cut away to open through said contact face whereby a binder is adapted to be received within said recess while remaining in substantial contact with the package, one wall of said recess being exposed for contact with the binder, and a binder-gripping wedge insertible into the recess and positioned for one face thereof to be opposite the binder-contacting face constituted by the wall of said recess, in combination with means for effecting a relative movement between said heads.

7. In a band tightener, a plurality of heads each having a substantially flat face adapted for contact with a package and provided with a recess one side of which is cut away to open through said contact face whereby a binder is adapted to be received within said recess while remaining in substantial contact with the package, the opposing walls of each recess being in converging relation and one wall of each recess being exposed for contact with the binder when the latter is within the recess, and binder-gripping wedge members each insertible into the recess of one head to occupy an opposing relation to the exposed binder contacting face constituted by a wall of said recess, in combination with means for effecting a relative movement between said heads.

In testimony whereof I have hereunto signed my name this 16th day of January, 1918.

SPENCER C. CARY.